(12) United States Patent
Davis et al.

(10) Patent No.: US 6,744,238 B2
(45) Date of Patent: Jun. 1, 2004

(54) METHOD OF USING A CELL

(75) Inventors: Steven M. Davis, Batavia, NY (US); David M. Spillman, Tonawanda, NY (US); Esther S. Takeuchi, East Amherst, NY (US)

(73) Assignee: Wilson Greatbatch Technologies, Inc., Clarence, NY (US)

( * ) Notice: Subject to any disclaimer, the term of this patent is extended or adjusted under 35 U.S.C. 154(b) by 0 days.

(21) Appl. No.: 10/141,845

(22) Filed: May 9, 2002

(65) Prior Publication Data

US 2002/0167292 A1 Nov. 14, 2002

Related U.S. Application Data

(60) Provisional application No. 60/290,371, filed on May 11, 2001.

(51) Int. Cl.$^7$ .................................................. H02J 7/00
(52) U.S. Cl. ...................................................... 320/128
(58) Field of Search ................................ 320/128, 124, 320/125, 132, 134, 135, 136, 160; 324/430, 433

(56) References Cited

U.S. PATENT DOCUMENTS

| | | | | |
|---|---|---|---|---|
| 3,854,082 A | * | 12/1974 | Nasby et al. | 320/160 |
| 4,131,841 A | * | 12/1978 | Bennefeld | 320/143 |
| 5,175,485 A | * | 12/1992 | Joo | 320/150 |
| 5,637,981 A | * | 6/1997 | Nagai et al. | 320/166 |
| 5,691,620 A | * | 11/1997 | Nagai et al. | 320/106 |
| 5,777,457 A | * | 7/1998 | Lee | 320/137 |
| 5,864,220 A | * | 1/1999 | Reipur et al. | 320/134 |
| 5,872,444 A | * | 2/1999 | Nagano et al. | 320/106 |
| 6,028,415 A | * | 2/2000 | Nagai et al. | 320/162 |
| 6,064,179 A | * | 5/2000 | Ito et al. | 320/128 |
| 6,087,810 A | * | 7/2000 | Yoshida | 320/139 |
| 6,124,700 A | * | 9/2000 | Nagai et al. | 320/132 |
| 6,166,521 A | * | 12/2000 | Mercer et al. | 320/125 |

* cited by examiner

Primary Examiner—Pia F Tibbits
(74) Attorney, Agent, or Firm—Hodgson Russ LLP

(57) ABSTRACT

The invention includes a method of using a cell, such as a battery. In a method according to the invention, the cell is charged, discharged, and a voltage of the cell is measured after the discharge period. The measured voltage is compared to a standard voltage, and then the cell is charged again.

22 Claims, 3 Drawing Sheets

METHOD OF USING A CELL

This application claims priority to U.S. provisional patent application No. 60/290,371 filed May 11, 2001, the benefit of which is hereby claimed.

BACKGROUND OF THE INVENTION

1. Field of the Invention

The present invention relates generally to devices and methods of using a cell, such as a battery.

2. Discussion of Related Art

In the prior art, there are devices for and methods of using cells. For example, U.S. Pat. No. 5,175,485 discloses an apparatus for controlling charging of a storage battery that initially charges the storage battery in a constant current charging mode and then in a constant voltage charging mode when the charging voltage across the storage battery reaches a desired value. Further, U.S. Pat. No. 6,087,810 discloses a battery charger which controls a charging control circuit so as to perform i) constant current charging at a first current value until the voltage value detected by the charging voltage detection circuit reaches a "second" voltage value, ii) constant voltage charging at the second voltage value when the voltage value detected by the charging voltage detection circuit reaches the second voltage value, iii) constant current charging at the first current value again when the current value detected by the charging current detection circuit drops to the second current value, and iv) constant voltage charging at a first voltage value when the voltage value detected by the charging voltage detection circuit reaches the first voltage value, thereby charging the battery.

It is believed the prior art charging methods and devices do not allow a cell to be used as long as the cell could be used. The present invention results in an increase in the number of times a cell may be charged and discharged before that cell no longer provides the energy necessary for the application to which the cell is applied.

SUMMARY

The invention may be embodied in a method of using a cell in which the cell is charged to a first voltage and discharged for a discharge time period. After the discharge time period, a voltage of the cell is measured, and compared to a standard voltage. If the measured voltage is greater than the standard voltage, the cell is charged to the first voltage, and if the measured voltage is not greater than the standard voltage, the cell is charged to a second voltage, the second voltage being greater than the first voltage.

The invention may also be embodied in a method of using a cell in which the cell is charged to a charge voltage and discharged for a discharge time period. After the discharge time period, a voltage of the cell is measured, and compared to a first standard voltage and a second standard voltage. If the measured voltage is not greater than the first standard voltage, the cell is charged to a new charge voltage which is greater than the charge voltage. If the measured voltage is greater than the second standard voltage, the cell is charged to a new charge voltage which is less than the charge voltage. If the measured voltage is greater than the first standard voltage, and the measured voltage is not greater than the second standard voltage, then the cell is charged to the charge voltage.

BRIEF DESCRIPTION OF THE DRAWINGS

For a fuller understanding of the nature and objects of the invention, reference should be made to the following detailed description taken in conjunction with the accompanying drawings, in which.

DETAILED DESCRIPTION OF THE INVENTION

Figure 1:
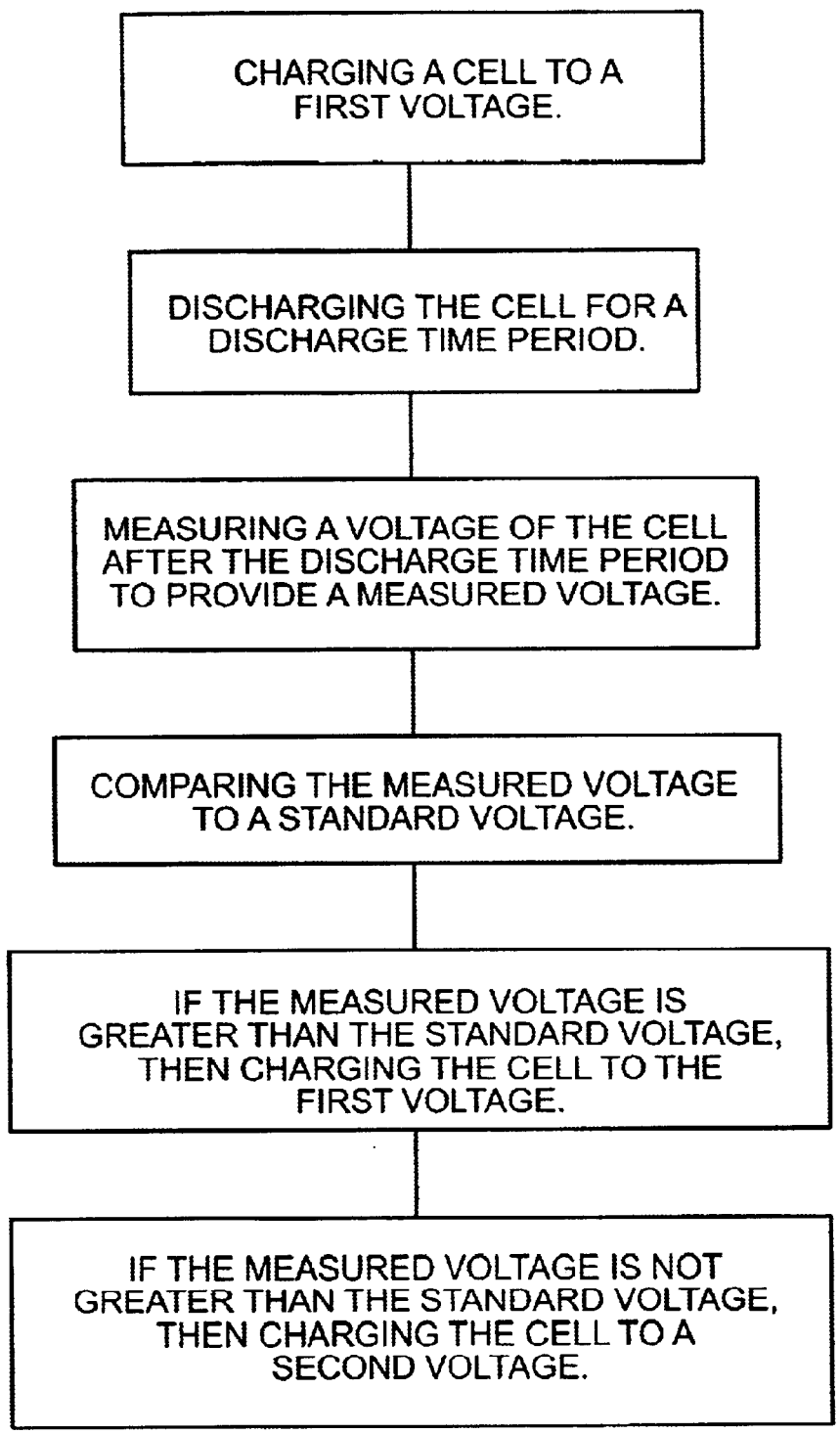
FIG. 1 is a flow chart of a method according to the invention.
Figure 2A:
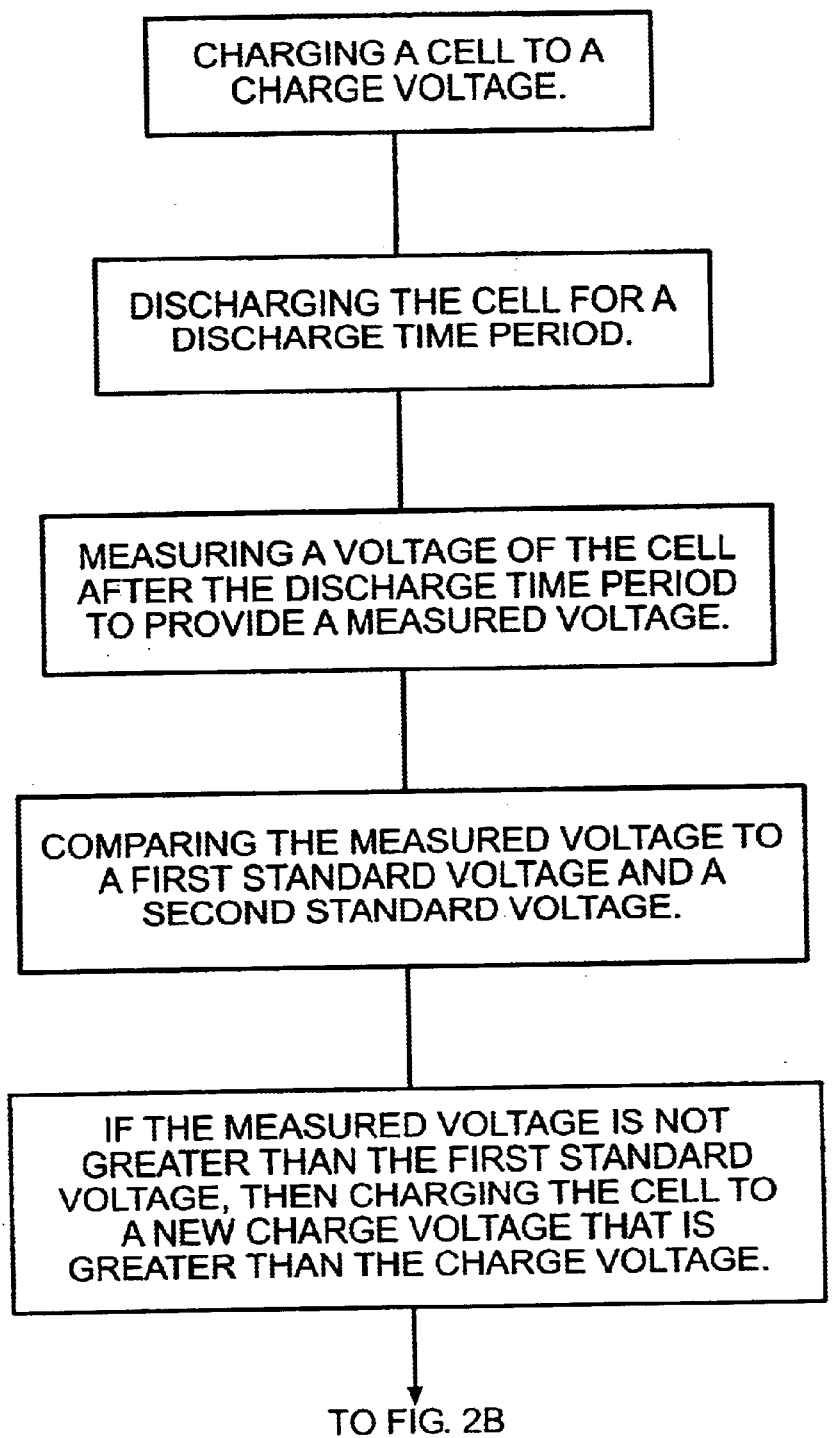
FIGS. 2A and 2B are a flow chart of a method according to the invention.
Figure 2B:
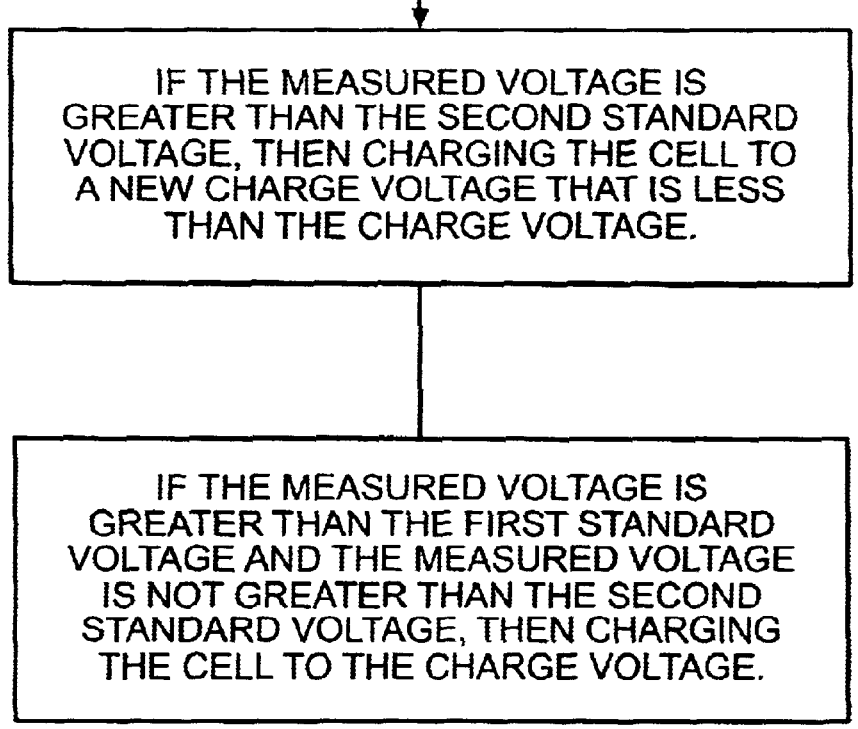

In a method according to the invention, a cell is charged to a first voltage. The cell is discharged for an amount of time, the amount of time is sometimes referred to herein as the "discharge time period". After the discharge time period, a voltage of the cell is measured and provided as a measured voltage. The measured voltage is compared to a standard voltage. If the measured voltage is greater than the standard voltage, then the cell is charged again to the first voltage. If the measured voltage is not greater than the standard voltage, then the cell is charged to a second voltage, the second voltage being greater than the first voltage.

The process of charging the cell to a voltage, discharging the cell for a time period, measuring the cell voltage after the discharge time period, determining whether the measured voltage is greater than a standard voltage, and charging the cell to the previous voltage or a higher voltage may be repeated. The voltage to which the cell is charged is sometimes referred to herein as the "charge voltage". The charge voltage may be desirably set so that after the discharge time period, the measured voltage is close to the standard voltage.

If the method described above is repeated enough times, the charge voltage will exceed a safe limit. For example, in a lithium-ion cell having a positive electrode made of a lithiated material, such as lithium cobalt oxide, and a negative terminal made of a carbonaceous material, the safe limit is widely recognized as 4.3 volts. Therefore, if a lithium-ion cell is charged by the method described herein to 4.3 volts, and after the discharge time period, the cell voltage is not greater than the standard voltage, then the lithium-ion cell may be deemed unsuitable for the use to which it was put. To provide a margin of safety, the charge voltage limit for a lithium-ion cell may be set lower than 4.3 volts, for example at 4.2 volts.

In a method according to the invention, the cell is charged to the first voltage by providing a charge current at a rate that is approximately constant. For example, in one method, a lithium-ion cell is provided and charged to a first voltage of approximately 3.8 volts by providing charge current at a charge rate that is not greater than a reference current rate. For example, the charge rate may be one-half of the reference current rate. The reference current rate may be approximately equal to a constant current rate that would reduce the voltage of the cell from approximately 4.2 volts to approximately 2.0 volts in approximately one hour. The cell is then discharged, for example by powering an electric circuit for the discharge time period. After the discharge time period, the voltage provided by the cell is measured and compared to a standard. For example, the standard may be approximately 2.5 volts. If the measured voltage is greater than the standard voltage, then the cell is charged again to approximately 3.8 volts, and may be charged using the same current rate. After charging to approximately 3.8 volts, the cell may be discharged again for the discharge time period, the cell voltage measured and compared to the standard voltage. This process of charging to approximately 3.8 volts, discharging, measuring the voltage after the discharge time period, and comparing to the standard voltage may be repeated until the measured voltage after the discharge time period is not greater than the standard voltage. Once the measured voltage is not greater than the standard voltage, the cell may be charged to a second voltage, for example 3.9 volts, and may be charged using the same current rate as before, or a higher current rate. Once charging to the second voltage no longer results in a measured voltage that is greater than the standard voltage, the cell may be charged to another voltage, for example 4.0 volts, and the process may be repeated until 4.0 volts no longer results in the desired measured voltage. The process may be repeated, each time increasing the charge voltage, for example by approximately 0.1 volts.

The charging portion of the method described above may be generally referred to as the constant current charging period. The cell may be further charged by following the constant current charging period with a constant voltage charging period in which charge current is provided at a variable current rate to maintain the charge voltage. Charging at the charge voltage may continue until the variable current rate drops below a threshold value. For example, in a lithium-ion cell, the threshold value may be set approximately equal to one-seventieth or one-eightieth of a reference current rate. The reference current rate may be approximately equal to a constant current rate that would reduce the voltage of the cell from approximately 4.2 volts to approximately 2.0 volts in approximately one hour. Once the variable current rate drops below the threshold current rate, the cell may be discharged, the cell voltage measured, and the measured voltage compared to a standard, as described above.

The comparing portion of the method described above may be modified. For example, in one such method the measured voltage is compared to a first standard voltage and a second standard voltage. If the measured voltage is not greater than the first standard voltage, then the charge voltage is increased and the cell is charged to a new charge voltage that is greater than the first charge voltage. However, if the measured voltage is greater than a second standard voltage, then the charge voltage is decreased and the cell is charged to a new charge voltage that is less than the first charge voltage. It is believed that this method may result in the cell being charged to a voltage that is close to the lowest voltage needed to provide enough energy to properly operate an electric circuit during the discharge time period.

It should be recognized that if the comparing portion of the method is carried out as described in the immediately preceding paragraph, the first standard voltage and the second standard voltage may be the same or different. If the comparing portion of the method is performed by setting the first standard voltage less than the second standard voltage, then the comparing portion of the method may be practiced so that if the measured voltage is both greater than the first standard voltage and not greater than the second standard voltage, then the charge voltage is not changed.

The invention may be particularly useful where it is expensive, risky, difficult or impossible to replace a rechargeable battery. For example, many medical devices are implanted in a living being. Such devices include pacemakers, defibrillators, heart assist devices, drug pumps, and hearing aids. Although the battery may be recharged while in the living being, it may be risky and expensive to replace the battery. Another use of the invention may be made in space craft, which may be difficult or impossible to retrieve in order to change a battery. Consequently, a primary design criteria of such devices may be the total number of times a power cycle may be provided. In some instances, the total number of power cycles provided by a cell may be a more important design criteria than the duration of a power cycle, i.e. the time a cell can deliver energy before reaching a low energy threshold. For example, by charging a hearing aid battery only to the minimum voltage needed to provide a given day's use, the useful life of the battery may be extended, thereby reducing the number of times the person must undergo surgery related to the hearing aid.

Although the present invention has been described with respect to particular embodiments, it will be understood that other embodiments of the present invention may be made without departing from the spirit and scope of the present invention. Hence, the present invention is deemed limited only by the appended claims and the reasonable interpretation thereof.

What is claimed is:

1. A method of using a cell, comprising:
   charging a cell to a first voltage;
   discharging the cell for a discharge time period;
   measuring a voltage of the cell after the discharge time period to provide a measured voltage;
   comparing the measured voltage to a standard voltage;
   if the measured voltage is greater than the standard voltage, then charging the cell to the first voltage;
   if the measured voltage is not greater than the standard voltage, then charging the cell to a second voltage, the second voltage being greater than the first voltage.

2. The method of claim 1, wherein the cell is a lithium-ion cell.

3. The method of claim 2, wherein the first voltage is approximately 3.8 volts.

4. The method of claim 2, wherein the standard voltage is approximately 2.5 volts.

5. The method of claim 2, wherein the second voltage is not greater than approximately 4.3 volts.

6. The method of claim 5, wherein the second voltage is greater than approximately 3.8 volts.

7. The method of claim 1, wherein the cell is charged to the first voltage by providing the cell with charge current at a first charge rate that is approximately constant.

8. The method of claim 7, wherein after the cell is charged to the first voltage by providing the cell with charge current at the first charge rate, charging continues by providing the cell with charge current at a variable rate, the variable rate being set so that the first voltage is maintained until the variable rate drops below a threshold value.

9. The method of claim 8, wherein the cell is a lithium-ion cell and the threshold value is approximately equal to one-seventieth of a reference current rate, the reference current rate being approximately equal to a constant current rate that would reduce a voltage of the cell from approximately 4.3 volts to approximately 2.0 volts in approximately one hour.

10. The method of claim 7, wherein the cell is a lithium-ion cell and the first charge rate is not greater than a reference current rate, the reference current rate being approximately equal to a constant current rate that would reduce a voltage of the cell from approximately 4.2 volts to approximately 2.0 volts in approximately one hour.

11. A method of using a cell, comprising:
    charging a cell to a charge voltage;
    discharging the cell for a discharge time period;
    measuring a voltage of the cell after the discharge time period to provide a measured voltage;
    comparing the measured voltage to a first standard voltage and a second standard voltage;

if the measured voltage is not greater than the first standard voltage, then charging the cell to a new charge voltage, the new charge voltage being greater than the charge voltage;

if the measured voltage is greater than the second standard voltage, then charging the cell to a new charge voltage, the new charge voltage being less than the charge voltage; and if the measured voltage is greater than the first standard voltage, and the measured voltage is not greater than the second standard voltage, then charging the cell to the charge voltage.

12. The method of claim 11, wherein the cell is a lithium-ion cell.

13. The method of claim 12, wherein the charge voltage is approximately 3.8 volts.

14. The method of claim 12, wherein the first standard voltage is approximately 2.5 volts.

15. The method of claim 12, wherein the new charge voltage is not greater than approximately 4.3 volts.

16. The method of claim 15, wherein the new charge voltage is greater than approximately 3.8 volts.

17. The method of claim 11, wherein the cell is charged to the charge voltage by providing the cell with charge current at a first charge rate that is approximately constant.

18. The method of claim 17, wherein after the cell is charged to the charge voltage by providing the cell with charge current at the first charge rate, charging continues by providing the cell with charge current at a variable charge rate, the variable charge rate being set so that the charge voltage is maintained until the variable charge rate drops below a threshold value.

19. The method of claim 18, wherein the cell is a lithium-ion cell and the threshold value is approximately equal to one-seventieth of a reference current rate, the reference current rate being approximately equal to a constant current rate that would reduce a voltage of the cell from approximately 4.3 volts to approximately 2.0 volts in approximately one hour.

20. The method of claim 17, wherein the cell is a lithium-ion cell and the first charge rate is not greater than a reference current rate, the reference current rate being approximately equal to a constant current rate that would reduce a voltage of the cell from approximately 4.2 volts to approximately 2.0 volts in approximately one hour.

21. The method of claim 11, wherein the first standard voltage is approximately equal to the second standard voltage.

22. The method of claim 11, wherein the first standard voltage is less than the second standard voltage.

* * * * *